US007702129B2

(12) United States Patent
Kervec et al.

(10) Patent No.: US 7,702,129 B2
(45) Date of Patent: Apr. 20, 2010

(54) IMAGE DISPLAY DEVICE AND METHOD

(75) Inventors: Jonathan Kervec, Paimpont (FR); Laurent Blondé, Thorigne-Fouillard (FR); Didier Doyen, La Bouexiere (FR)

(73) Assignee: Thomson Licensing, Boulogn-Billancourt (FR)

( * ) Notice: Subject to any disclaimer, the term of this patent is extended or adjusted under 35 U.S.C. 154(b) by 961 days.

(21) Appl. No.: 11/449,317

(22) Filed: Jun. 8, 2006

(65) Prior Publication Data
US 2007/0013770 A1 Jan. 18, 2007

(30) Foreign Application Priority Data
Jun. 21, 2005 (FR) .................................. 05 51686

(51) Int. Cl.
*G06K 9/00* (2006.01)
(52) U.S. Cl. .................................................... 382/100
(58) Field of Classification Search ................ 382/100; 358/3.28; 380/235, 229, 10–19, 200–205, 380/221, 238, 210, 218; 713/176
See application file for complete search history.

(56) References Cited
U.S. PATENT DOCUMENTS
7,043,019 B2 * 5/2006 Tehranchi et al. ........... 380/218

7,206,409 B2 * 4/2007 Antonellis et al. .......... 380/202
2002/0168069 A1 * 11/2002 Tehranchi et al. ........... 380/235
2004/0250079 A1 12/2004 Kalker et al.

FOREIGN PATENT DOCUMENTS
WO WO 2004/030339 A2 4/2004

OTHER PUBLICATIONS
European Search Report.
\* cited by examiner

*Primary Examiner*—Sherali Ishrat
(74) *Attorney, Agent, or Firm*—Robert D. Shedd; Harvey D. Fried; Richard LaPeruta

(57) ABSTRACT

The present invention relates to a device and a method for displaying images. To combat the copying of images by a camcorder in a cinema auditorium, modulating the luminance of the pixels of a pattern around the value to be displayed to a high frequency which makes the pattern invisible to the human eye but which generates artifacts on the sequence filmed by the camcorder is known. According to the invention, it is proposed to temporally modulate the pattern only in the fixed areas (background or indoor scenes) or, where appropriate, the areas with weak movements. Thus, rather than degrading the image in the areas with movement by applying to them the temporal modulation processing, a decision is taken not to temporally modulate the pattern in these critical areas.

7 Claims, 4 Drawing Sheets

IMAGE DISPLAY DEVICE AND METHOD

This application claims the benefit, under 35 U.S.C. §119, of French Patent Application No. 0551686 filed 21 Jun. 2005.

FIELD OF THE INVENTION

The present invention relates to a device and a method for displaying images.

BACKGROUND OF THE INVENTION

Visual contents, whether fixed or moving pictures, are normally creations that are covered by copyright-related guarantees of exclusivity. Reproducing them is normally allowed only within a strictly defined framework which allows the authors and their beneficiaries to be remunerated.

In order to ensure that these legal rules are correctly observed, numerous systems have been developed to prevent illegal copies or sufficiently degrade their quality to make them unusable.

In this context, the object of patent application EP 1 237 369 is to combat the copying of images by picture taking when they are displayed, for example by a camcorder in a cinema auditorium. To this end, it is proposed to modulate the luminance of the pixels of a pattern around the value to be displayed to a high frequency that makes the pattern invisible to the human eye but that generates artefacts on the sequence filmed by the camcorder. This pattern is commonly called a tattoo or an anti-copy pattern.

The form of the pattern is determined to produce, for example, messages of the "ILLEGAL COPY" type that will appear in the images displayed by the camcorder.

For the pattern to be invisible to the naked eye, the modulation consists in alternating images in which the pattern is light with images in which it is dark, the average intensity of the pattern over several images corresponding to that to be displayed in the images in the absence of a pattern. When these images are displayed, the eye performs an integration and, in fact, perceives the average intensity.

Another method consists in modulating the colour of the pixels of the pattern without modifying their luminance. The colour of the pixels of the pattern is modulated around the colour to be displayed at a high frequency that makes the pattern invisible to the human eye. This method is then based on colour fusion. It is described in very great detail in international patent application WO 05/027529.

Generally, the purpose of this temporal modulation is to distribute over time a parameter that is received at a given instant t. This parameter is normally linked to the video and can be, as indicated previously, the luminance or colour. The temporal distribution is done at instants separated by "frame" or "subframe" times.

This technique does, however, present a problem when the images represent a moving scene. In practice, since the eye tends to follow the movement in the image, the temporal integration is no longer done correctly and the pattern then appears to the naked eye. Consider the example of a modulation creating a luminance deficit for a pixel P of the pattern in a first image and a complementary luminance surplus for the same pixel in a second picture. If the eye does not move, it adds together the luminances of these two pixels and then perceives the average luminance value. The perception of the eye is then correct. If the eye moves, the pixel P in the first image is not integrated by the same retinal area of the eye as this same pixel in the second image. The visual sum between these two pixels is no longer correct and the pattern is then detected by the eye.

To overcome this problem, it is possible to have the pattern move in accordance with the movement of the eye in such a way that the latter integrates the video parameters relating to one and the same pixel in the two successive images displayed. This movement compensation technique can be used to limit the defects and improve the quality of the processing but presupposes a high accuracy of the movement vectors and a good reliability of the movement estimator.

SUMMARY OF THE INVENTION

One object of the invention is to propose a method and a device for eliminating these drawbacks.

According to the invention, it is proposed to temporally modulate the pattern only in the fixed areas or, where appropriate, the areas with weak movements. In practice, the processing must not be visible to the eye of the viewer but only visible to the pirate photographing system. In a film, many shots are fixed or include fixed areas or areas with little movement, for example the backgrounds or interior scenes. Thus, rather than degrading the image in the areas in motion by applying the temporal modulation processing to them, a decision is taken not to temporally modulate the pattern in these critical areas.

Also, the present invention relates to an image processing method intended to display at least one anti-copy pattern in a sequence of source images, each source image comprising a plurality of pixels organized in rows and columns and said pattern comprising a set of pixels selected in said image, each pixel having a predetermined video parameter in each of the source images, the method including a modulation step for temporally modulating the video parameter of each pixel of the pattern around its predetermined video parameter so as to be invisible to the human eye and create artefacts when said images are copied by photography when they are displayed. The method of the invention also comprises, prior to the modulation step, a step for detecting fixed areas in the sequence of source images and the pixels of the pattern (that are temporally modulated) are selected from the pixels of the detected fixed areas.

Implementing this method is very simple since it requires only the addition of a fixed area detector.

The video parameter that is modulated is either the luminance or the chrominance of the pixels. It is also possible to envisage modulating both together.

According to an embodiment variant, it is also possible to modulate the video parameter of pixels belonging to areas of weak movement (areas in which the movement is less than a movement threshold) in the sequence of source images.

BRIEF DESCRIPTION OF THE DRAWINGS

The invention will be better understood by reading the description that follows, given by way of non-limiting example, and in reference to the appended drawings in which.

DETAILED DESCRIPTION OF PREFERRED EMBODIMENTS

Figure 1:
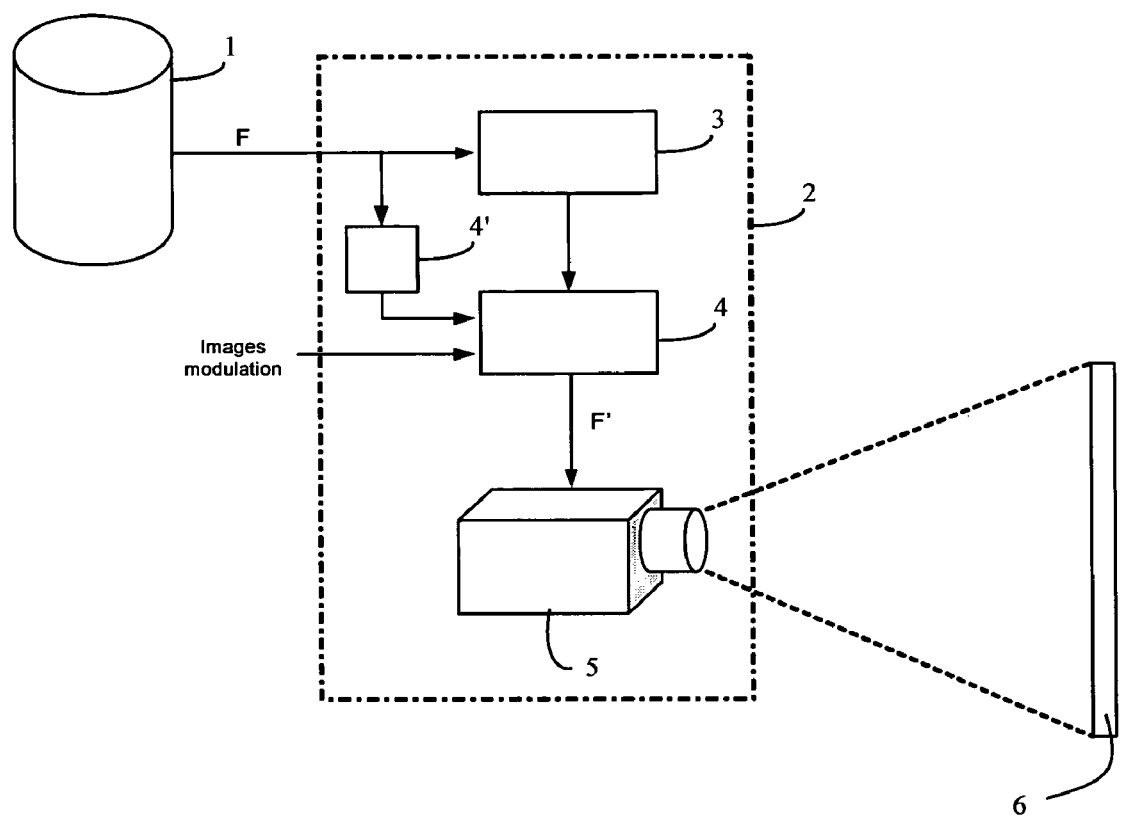
FIG. 1 illustrates a device designed to implement the method of the invention.

The description below will be given in the context of images encoded in digital form, but the invention is naturally not limited to this type of encoding. In this context, the image or images to be displayed are described by data stored on an information medium 1, such as an optical disc, a hard disc or a magnetic tape. This data can also originate from a transmission channel (microwave, satellite, cable or ADSL, for example). The display system 2 receives this data in the form of a source stream F which represents the sequence of images to be displayed. It comprises a detection circuit 3 for detecting the fixed areas in the sequence of images and a modulation circuit 4 for temporally modulating the so-called modulation images in said sequence. The modulation images determine the anti-copy pattern to be introduced into the sequence of images. The pattern can, for example, consist of a message indicating that copying these images is illegal. The duly modulated images are then supplied in the form of a stream F' to a display device 5 with its screen 6.

Figure 2:
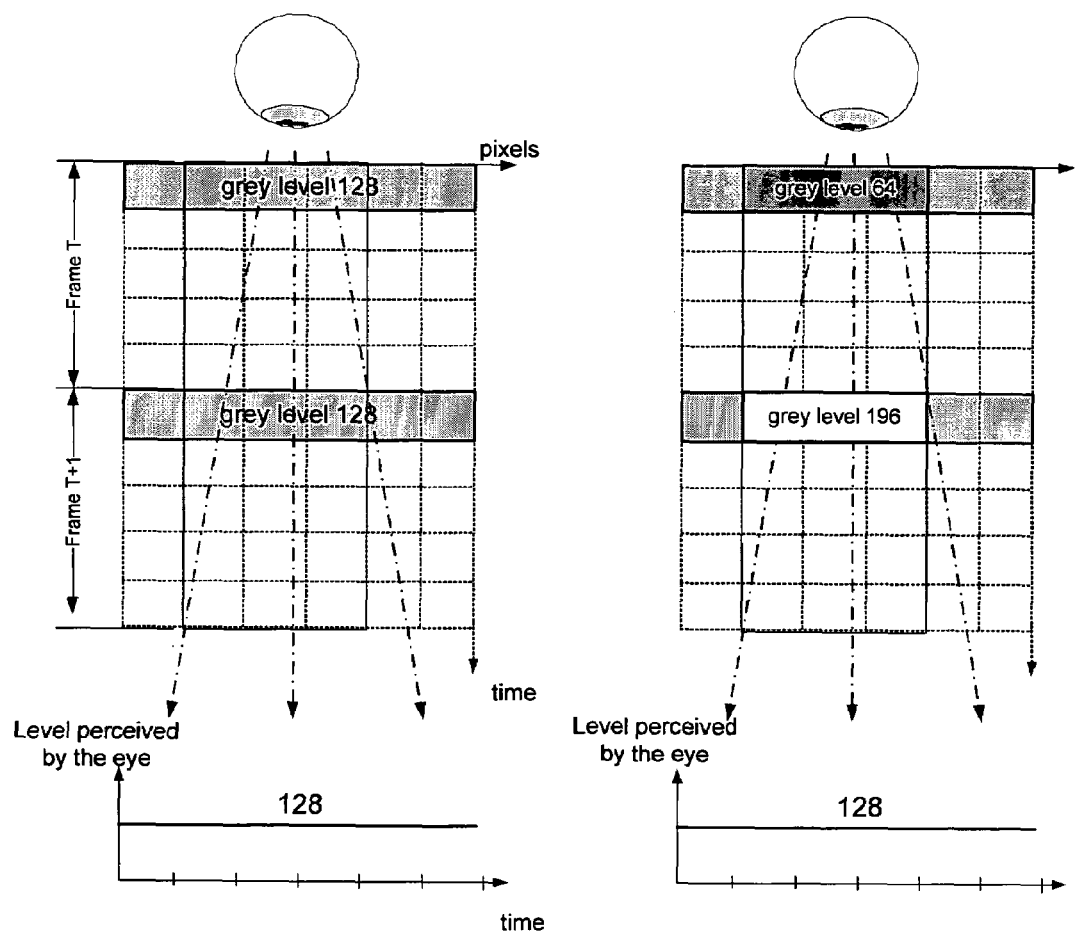
FIG. 2 represents the video levels perceived by the human eye on displaying a sequence of images without anti-copy pattern and with anti-copy pattern temporally modulated in the fixed areas of the images.

FIG. 2 illustrates the conventional display of a grey level 128 over two consecutive frames T and T+1 with, for example, a cathode ray tube projector. The x-axis represents the pixels of the image and the y-axis represents the time. The left-hand part of the figure represents the display of a fixed image without temporally modulated pattern and the right-hand part of the figure represents the display of the same image in which a pattern is temporally modulated. This pattern is modulated over three pixels. For these three pixels, a grey level 64 is displayed during the first frame and a grey level 196 during the frame T+1. The eye integrates these two levels and perceives a grey level 128, which makes the pattern invisible to the viewer.

Figure 3:
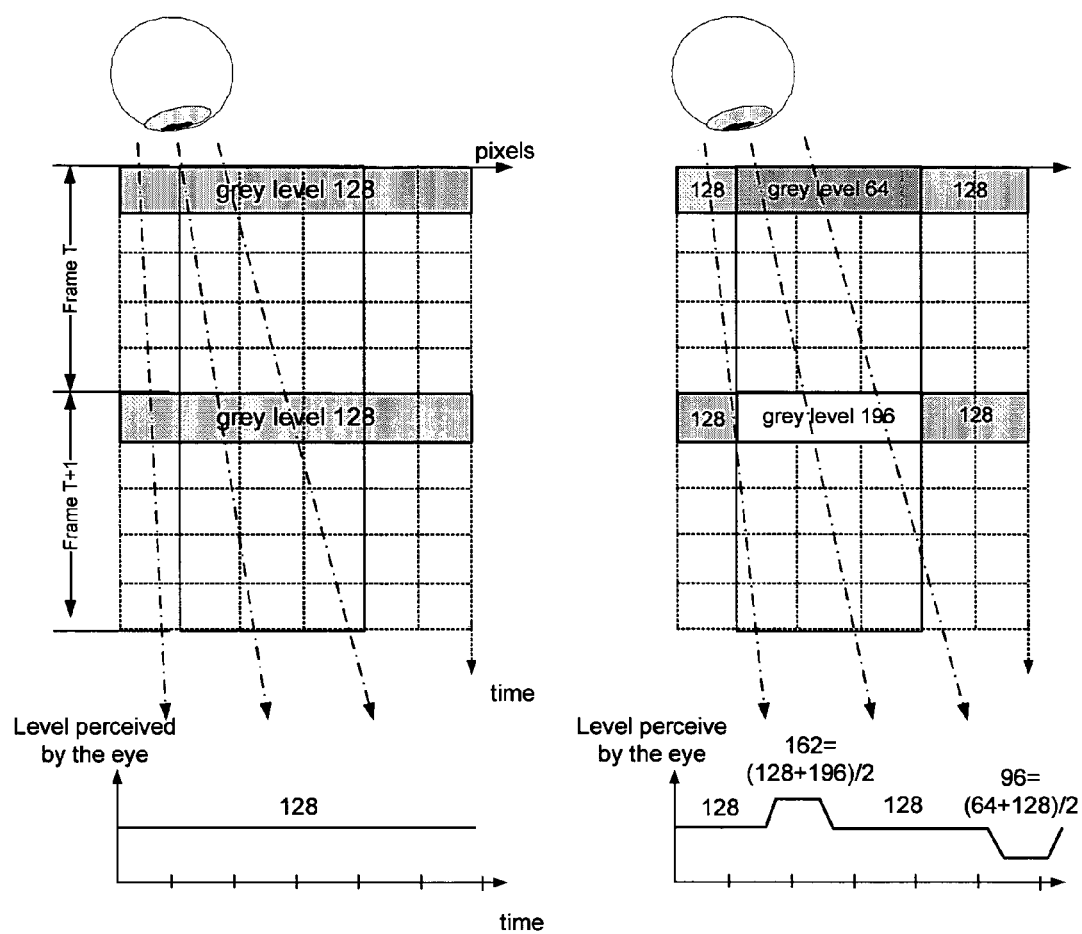
FIG. 3 represents the video levels perceived by the human eye on displaying a sequence of images without anti-copy pattern and with anti-copy pattern temporally modulated in the non-fixed areas of the images.

In contrast, the temporal integration of the eye in the case of a non-fixed image is represented in FIG. 3. In this figure, the image is offset by one pixel to the right between the frame T and the frame T+1. The eye follows this movement between the two frames and therefore detects undesirable grey levels 162 (=(128+196)/2) and 96 (=(64+128)/2).

Consequently, according to the invention, detecting fixed areas of the image to be displayed and modulating an anti-copy pattern in these areas is a way of avoiding any risk of these defects becoming apparent.

According to the invention, the images of the stream F are analysed by the circuit 3 to detect the fixed areas in the images. The term "fixed area" is used to mean an area of the image in which the pixels have the same level over at least two consecutive frames. The detection can be done by macro-blocks of pixels (blocks of several tens of pixels) or over smaller blocks (size between two and ten pixels). In the case of a detection by macro-blocks, the video levels of the pixels of each macro-block are compared over two consecutive frames and if, for a given macro-block, the video levels of all the pixels of the macro-block are unchanged, it is assumed that this macro-block belongs to a fixed area. In the case of a detection by smaller sized block, the video levels of the pixels of each macro-block are compared over a larger number of executive frames, for example six frames, and if, for a given block, the video levels of all the pixels of the block are unchanged, it is assumed that this block belongs to a fixed area. This type of detection circuit is well known to those skilled in the art and has the advantage of being more reliable than a movement estimator. For each block or macro-block, it delivers parameter information representative of its affiliation to a fixed area.

According to an embodiment given by way of example, the images of the source stream F are then processed in pairs and, for each pair of images considered in this way, two images modified for display by the device 5 are generated as output. For the parameter information from the detection circuit 3 to correspond to the images present at the input of the modulation circuit 4, the images of the source stream F are delayed by a delay circuit 4' before being supplied to the input of the modulation circuit 4. This delay corresponds to the time to process each image by the detection circuit 3. The delay circuit 4' is, for example, an image memory in the case of a detection by macro-block. Two modulation images are moreover supplied alternately to another input of the circuit 4 to modulate, each in turn, the images of the stream F. One is used to modify, in a first image, the video level of the pixels corresponding to the anti-copy pattern and the other to modify, in the next image, the video level of these same pixels in an inverse proportion. For example, the modulation can consist in increasing by 20 the video level of the pixels of the pattern in a first image then lowering it by 20 in the next image.

This embodiment (two output images for two source images) corresponds to the case where the frequency of the source stream F is equal to the display frequency of the device 5, a frequency for which the modulated pattern in the images is invisible to the naked eye. If the frequency of the source stream is insufficient, it is, for example, possible to provide for two or more images to be generated from each source image.

The invention will now be described more particularly in the context of a temporal modulation of the luminance of the pixels of the anti-copy pattern. The display frequency of the device 5 is therefore taken to be greater than the temporal integration frequency of the human eye, for example 50 or 60 Hz.

Figure 4:
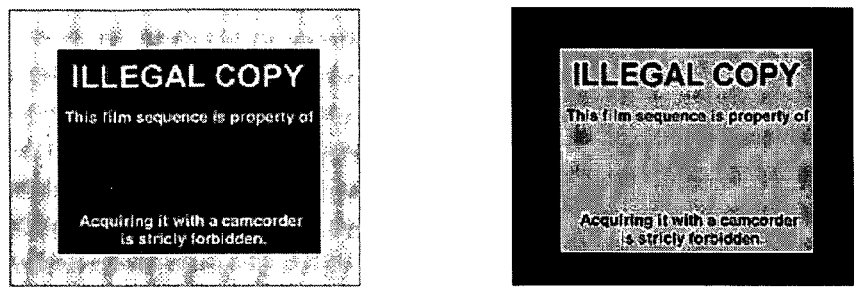
FIG. 4 represents images illustrating the temporal modulation applied to the images of the sequence to be displayed.

FIG. 4 illustrates an example of modulation images applied to the images of the stream F. The light parts of the images represent the pixels for which the level is increased with the modulation and the dark parts the pixels for which the level is lowered. The two images are applied alternately to the images of the stream F. They show that, when a level is lowered by a quantity in a first image, this level is increased by the same quantity in the next image, and vice-versa. This modulation is performed in the fixed areas of the images.

Figure 5:
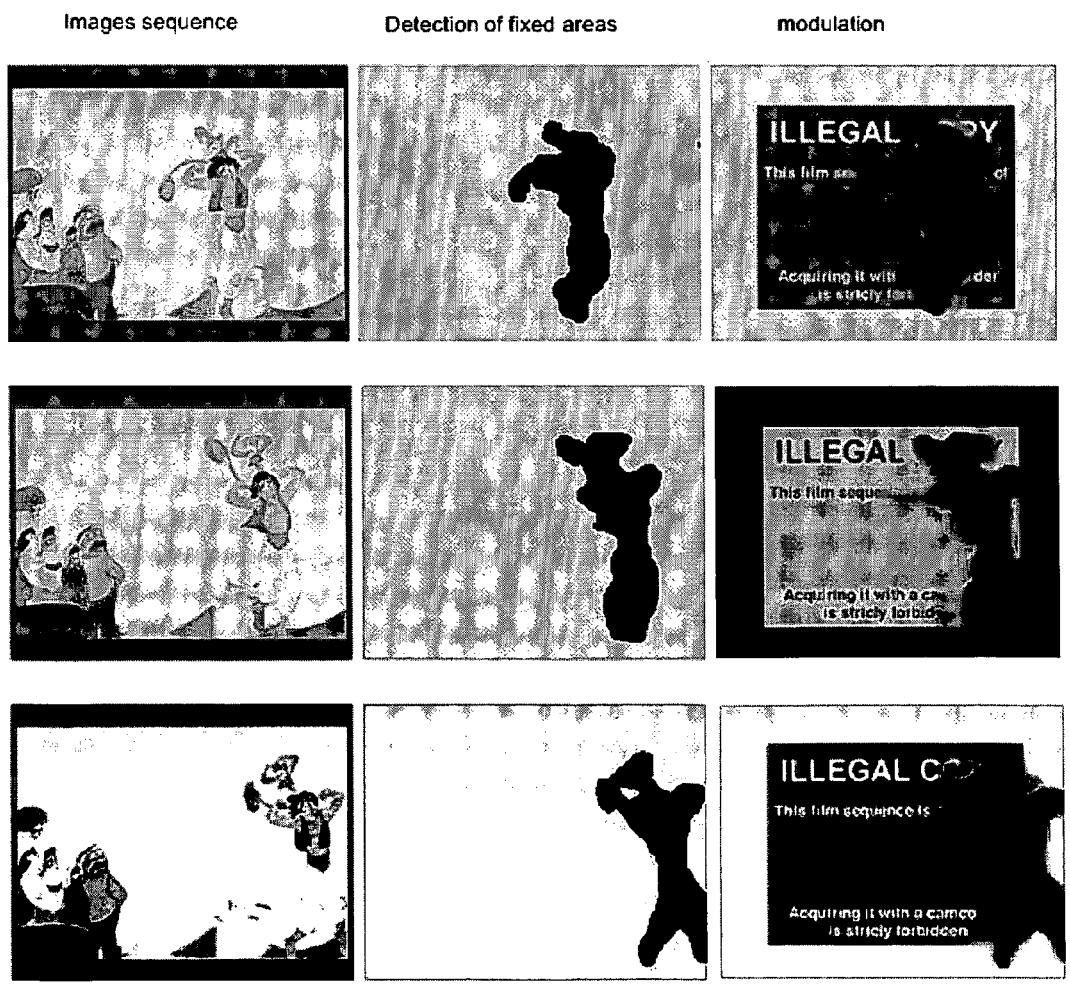
FIG. 5 illustrates the detection and temporal modulation applied to the images to be displayed in accordance with the invention.

FIG. 5 illustrates the detection and modulation steps applied to a sequence of three consecutive images comprising a person moving to the right. The other people in the scene are stationary. The left-hand part of the figure represents the sequence of the three images to be displayed. The central part represents the result of the detection of the fixed areas (for example by macro-blocks) in these three images and the right-hand part shows the portion of the modulation images that is modulated in the fixed areas of these three images. In the central part, the light areas represent the fixed areas of the images and the dark areas represent the areas in motion. It will be noted that, to improve the understanding of the invention, the movement to the right of the person has been exaggerated (movement of several tens of pixels between each image). It is generally only a few pixels and the fixed areas of two consecutive images normally vary very little.

According to an improvement, the modulation is reduced around the areas not detected as fixed and identified by blurred areas in the images in the right-hand part of FIG. 5. A blurred area of fixed width is thus defined around the non-fixed areas, for example 50 pixels. In this area, the modulation decreases advantageously progressively as the non-fixed area is approached. Thus, for example, if the level of the pixels in the fixed areas is modulated by +/−1-20, the amplitude of this modulation will be decreased in the blurred areas until a zero amplitude is reached around the area detected as non-fixed. This transition from a modulated area to a non-modulated area and vice-versa is thus performed progressively so that the viewer is not disturbed by the abrupt appearance or disappearance of the temporal modulation of the anti-copy pattern.

According to an embodiment variant, it is proposed to perform the modulation not only in the fixed areas of the image but also in the areas of the image with little movement, that is, the areas where the movement is below a movement threshold, for example, the areas being displaced by less than two pixels per frame. Such a movement is not, in practice, detected by the eye and it will not therefore tend to follow it. This embodiment requires the use of a movement estimator designed to measure the amplitude of the movement. The direction of the movement is not used by the method of the invention and therefore does not need to be estimated accurately. The movement estimator used can therefore be very simple.

The invention claimed is:

1. Image processing method to display at least one anti-copy pattern in a sequence of source images, each source image comprising a plurality of pixels organized in rows and columns and said pattern comprising a set of pixels selected in said image, each pixel having a predetermined video parameter in each of the source images, said method comprising a modulation step for temporally modulating the video parameter of each pixel of the pattern around its predetermined video parameter so as to be invisible to the human eye and create artefacts when said images are copied by picture taking when they are displayed, wherein, prior to said modulation step, it also comprises a step for detecting fixed areas in the sequence of source images and in that the pixels of said pattern are selected from the pixels of the detected fixed areas.

2. Method according to claim 1, wherein said video parameter is the luminance and/or the chrominance of the pixel.

3. Method according to claim 1, wherein it also comprises a step for detecting areas with weak movement, the movement of which is less than a threshold in the sequence of source images and in that the pixels of said pattern are selected from the pixels of the fixed areas or areas with weak movement detected.

4. Method according to claim 1, wherein the amplitude of the temporal modulation is reduced in the vicinity of the areas of the source images not detected as fixed areas.

5. Method according to claim 4, wherein the amplitude of the temporal modulation is reduced progressively in the vicinity of the areas of the source images not detected as fixed areas.

6. Image processing device to display at least one anti-copy pattern in a sequence of source images, each source image comprising a plurality of pixels organized in rows and columns and said pattern comprising a set of pixels selected from said image, each pixel having a predetermined video parameter in each of the source images, said device comprising a modulation circuit for temporally modulating the video parameter of each pixel of the pattern around its predetermined video parameter so as to be invisible to the human eye and create artefacts when said images are copied by picture taking when they are displayed, wherein it also comprises a circuit for detecting fixed areas in the sequence of source images and in that the pixels modulated by the modulation circuit are selected from the pixels of the detected fixed areas.

7. Device according to claim 6, wherein it also comprises a movement estimator for detecting the image areas with weak movement the movement of which is less than a threshold within the sequence of source images and in that the pixels modulated by the modulation circuit are selected from the pixels of the fixed areas with weak movement detected.

* * * * *